US011986027B2

(12) United States Patent
Van de Zande et al.

(10) Patent No.: US 11,986,027 B2
(45) Date of Patent: May 21, 2024

(54) ELECTRONIC GARMENT WITH HAPTIC FEEDBACK

(71) Applicant: dotBliss LLC, Cary, NC (US)

(72) Inventors: Charles Tyson Van de Zande, Raleigh, NC (US); Jesse John Whitcomb Klein, Madison, NJ (US)

(73) Assignee: dotBliss LLC, Cary, NC (US)

( * ) Notice: Subject to any disclaimer, the term of this patent is extended or adjusted under 35 U.S.C. 154(b) by 0 days.

(21) Appl. No.: 18/328,163

(22) Filed: Jun. 2, 2023

(65) Prior Publication Data

US 2023/0301372 A1    Sep. 28, 2023

Related U.S. Application Data

(63) Continuation of application No. 17/823,089, filed on Aug. 30, 2022, now Pat. No. 11,700,891, which is a
(Continued)

(51) Int. Cl.
*A41D 1/00*    (2018.01)
*G06F 1/16*    (2006.01)
(Continued)

(52) U.S. Cl.
CPC ............ *A41D 1/002* (2013.01); *G06F 1/163* (2013.01); *G06F 3/016* (2013.01); *G06F 3/044* (2013.01);
(Continued)

(58) Field of Classification Search
CPC .... G06F 1/167; G06F 1/163; H04M 1/72412; A41D 1/002
See application file for complete search history.

(56) References Cited

U.S. PATENT DOCUMENTS

| 6,430,450 B1 | 8/2002 | Bach-Y-Rita et al. |
| 7,083,295 B1 | 8/2006 | Hanna |

(Continued)

FOREIGN PATENT DOCUMENTS

| CA | 2319525 A1 | 8/1999 |
| KR | 1020140086426 A | 7/2014 |

(Continued)

OTHER PUBLICATIONS

ISA/KR; International Search Report and Written Opinion for International Patent Application No. PCT/US2018/059138 dated Feb. 22, 2019, 14 pages.

(Continued)

*Primary Examiner* — Andrea C Leggett
(74) *Attorney, Agent, or Firm* — NK Patent Law

(57) ABSTRACT

System includes a haptic garment comprising an integrated circuit (IC) controller coupled to the haptic garment. A sensing circuit configured to cause to transmit a motion signal sensed by a portion of the haptic garment surface to the IC controller is provided. The motion signal is based on one or more of a touch pattern, a gesture pattern, and a movement pattern associated with a user of the haptic garment. The IC controller is configured to transmit a first data associated with the motion signal to an external device. Conductive traces embedded in the haptic garment that electrically couple with the sensing circuit.

26 Claims, 10 Drawing Sheets

Related U.S. Application Data continuation of application No. 16/860,378, filed on Apr. 28, 2020, now Pat. No. 11,478,022, which is a continuation of application No. PCT/US2018/059138, filed on Nov. 5, 2018.

(60) Provisional application No. 62/582,762, filed on Nov. 7, 2017.

(51) Int. Cl.
| | | |
|---|---|---|
| *G06F 3/01* | (2006.01) | |
| *G06F 3/044* | (2006.01) | |
| *G06F 3/0488* | (2022.01) | |
| *G06F 3/16* | (2006.01) | |
| *H04M 1/72412* | (2021.01) | |

(52) U.S. Cl.
CPC ............ *G06F 3/0488* (2013.01); *G06F 3/167* (2013.01); *H04M 1/72412* (2021.01)

(56) References Cited

U.S. PATENT DOCUMENTS

| | | | |
|---|---|---|---|
| 7,719,007 | B2 | 5/2010 | Tompkins et al. |
| 8,362,882 | B2 | 1/2013 | Heubel et al. |
| 9,626,845 | B2 | 4/2017 | Eagleman et al. |
| 10,004,286 | B2 | 6/2018 | Salter et al. |
| 10,019,912 | B2 | 7/2018 | Eagleman et al. |
| 2006/0212097 | A1 | 9/2006 | Varadan et al. |
| 2006/0258914 | A1 | 11/2006 | Derchak et al. |
| 2010/0097346 | A1 | 4/2010 | Sleeman |
| 2011/0148607 | A1 | 6/2011 | Zeleny |
| 2013/0036529 | A1 | 2/2013 | Salter et al. |
| 2014/0239982 | A1 | 8/2014 | Alameh et al. |
| 2014/0318699 | A1* | 10/2014 | Longinotti-Buitoni ................... H05K 1/095 156/247 |
| 2014/0320402 | A1 | 10/2014 | Stahlberg |
| 2015/0104772 | A1 | 4/2015 | Goel et al. |
| 2016/0007919 | A1* | 1/2016 | Pernu ................... A61B 5/6804 600/388 |
| 2016/0012688 | A1 | 1/2016 | Eagleman et al. |
| 2016/0077587 | A1* | 3/2016 | Kienzle ................... G06F 3/033 345/156 |
| 2016/0239087 | A1 | 8/2016 | Shih et al. |
| 2016/0302699 | A1 | 10/2016 | Gal |
| 2017/0178539 | A1 | 6/2017 | Eagleman et al. |
| 2017/0196513 | A1* | 7/2017 | Longinotti-Buitoni ................... D06P 1/5285 |
| 2017/0224280 | A1 | 8/2017 | Bozkurt et al. |
| 2017/0249810 | A1 | 8/2017 | Zerick et al. |
| 2017/0344178 | A1 | 11/2017 | Vekhter et al. |
| 2018/0033263 | A1 | 2/2018 | Novich et al. |
| 2018/0055400 | A1* | 3/2018 | Dodemont ............. A61B 5/318 |
| 2018/0067558 | A1 | 3/2018 | Eagleman et al. |
| 2018/0233163 | A1* | 8/2018 | Eagleman ............... G10L 21/16 |
| 2019/0208837 | A1 | 7/2019 | Poupyrev et al. |

FOREIGN PATENT DOCUMENTS

| | | |
|---|---|---|
| KR | 101558837 B1 | 3/2015 |
| WO | 2016149751 A1 | 9/2016 |
| WO | 2016198969 A1 | 12/2016 |
| WO | 2017079445 A1 | 5/2017 |
| WO | 2017087862 A1 | 5/2017 |

OTHER PUBLICATIONS

Van De Zande, Ty, et al., "Printerface: Screen Printed Electroluminescent Touch Interface", Oct. 17, 2017, 4 pages, 10.1145/3132272.3132286.

WIPO; International Preliminary Report on Patentability for International Patent Application No. PCT/US2018/059138 dated May 12, 2020, 10 pages.

Turkpatent; Office Action for Turkish Patent Application No. 2020/06955, dated Jan. 14, 2022, 10 pages.

USPTO; Final Office Action for U.S. Appl. No. 16/860,378 dated Mar. 8, 2022, 70 pages.

USPTO; Non-Final Office Action for U.S. Appl. No. 16/860,378 dated Sep. 2, 2021, 66 pages.

Google search "haptic garment with actuator and conductive traces", searched on Aug. 20, 2021, 2 pages.

China National Intellectual Property Administation, First Office Action in Chinese Patent Application No. 2018800813287 dated Mar. 29, 2023, 3 pages.

CNIPA, Notice of Decision on Rejection for corresponding Chinese Patent Application No. 2018800813287 dated Jan. 30, 2024, 17 pages.

* cited by examiner

FRONT VIEW (ON WEARER)

BACK VIEW (ON WEARER)

FRONT VIEW (WHEN NOT ON WEARER)

BACK VIEW (WHEN NOT ON WEARER)

ELECTRONIC GARMENT WITH HAPTIC FEEDBACK

CROSS-REFERENCE TO RELATED APPLICATIONS

This application is a continuation of U.S. patent application Ser. No. 17/823,089, filed on Aug. 30, 2022, which is a continuation of U.S. patent application Ser. No. 16/860,378, filed on Apr. 28, 2020, now U.S. Pat. No. 11,478,022 issued on Oct. 25, 2022, which is a continuation of International Patent Application No. PCT/US18/59138, filed on Nov. 5, 2018, which claims priority to U.S. Provisional Patent Application No. 62/582,762 filed on Nov. 7, 2017, the entire contents of which are all hereby incorporated herein by reference.

TECHNICAL FIELD

The present invention relates to an electronic garment with electronic circuitry, and particularly to a haptic garment configured for two-way communication with a user of the haptic garment through electronic circuitry and sensors coupled to the haptic garment.

BACKGROUND

An individual involved in an activity such as bicycle riding, bike riding, scooter riding, or car racing, for example, may be required to stay focused on the task while in motion and therefore be unable to send or receive information that needs to be timely communicated to/from by the individual that is focused on the activity. For example, a bicyclist may want to get an idea of the traffic condition behind or in front of the bicyclist, but may not be able to do so in a safe manner due to the need to take eyes off the road in order to turn the head to assess the traffic conditions; however, such an action has the potential to render the bicycle unstable or to otherwise present a potential safety hazard. Similarly, the bicyclist may want to start playing a music file on a mobile device such as a cell phone while the bicycle is in motion; however, attempting to access and/or operate the mobile device while the bicycle in motion may present a safety hazard.

Accordingly, a need exists for improved communication capabilities whereby a bicyclist is able to perform the above mentioned and similar other tasks in a safe manner while the bicycle is being operated by the bicyclist.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a system comprising a haptic garment comprising an integrated circuit (IC) controller coupled to the haptic garment; a sensing circuit configured to cause to transmit a motion signal sensed by a portion of the haptic garment surface to the IC controller, the motion signal based on one or more of a touch pattern, a gesture pattern, and a movement pattern associated with a user of the haptic garment, the IC controller configured to transmit a first data associated with the motion signal to an external device; and conductive traces embedded in or fastened to the haptic garment that electrically couple with the sensing circuit.

According to one or more embodiments, the system further comprises the IC controller configured to receive a second data associated with an image signal from the external device; and a display circuit configured to cause to display an image on a electro-luminescent (EL) display coupled to a portion of the haptic garment surface based on the image signal received from the IC controller, wherein the conductive traces further electrically couple with the display circuit.

According to one or more embodiments, the system further comprises the IC controller configured to receive a third data associated with an actuator signal from the external device; and an actuator circuit configured to cause to transmit an actuator output to the portion of the haptic garment surface that is in sensory contact with a skin surface of the user of the haptic garment based on the actuator signal received from the IC controller, the actuator output comprising one or more of a tactile output and an acoustic output, wherein the conductive traces further electrically couple with the actuator circuit.

According to one or more embodiments, the IC controller is configured to multiplex across a switching cycle comprising: a sense phase for receiving the motion signal via the sensing circuit, a display phase for transmitting the image signal via the display circuit, and an actuator phase for transmitting the actuator signal via the actuator circuit.

According to one or more embodiments, the conductive traces are configured to perform one or more of: display the image based on the image signal received from the IC controller, transmit the actuator output based on the actuator signal received from the IC controller, and capture one or more of: the touch pattern, the gesture pattern, and the movement pattern associated with the user of the haptic garment to generate the motion signal for transmission to the IC controller.

According to one or more embodiments, the conductive traces are embedded in the haptic garment by one or more of: weaving, knitting, gluing, stitching, attaching by Velcro, mechanically fastening and printing on the haptic garment.

According to one or more embodiments, the image is alphanumeric text related to one or more of a telephone call and a text message received at the external device.

According to one or more embodiments, the third data is associated with a program operating on an internal memory coupled to the IC controller.

According to one or more embodiments, the image is based on a multimedia file located on the external device.

According to one or more embodiments, the image is one or more touch controls configured for operating a multimedia file located on the external device.

According to one or more embodiments, the image is indicative of traffic condition contiguous to the user of the haptic garment, the image based on traffic data received by the external device.

According to one or more embodiments, the image is related to a driving direction or a driving area map received from the external device.

According to one or more embodiments, the image is based on a camera image, a proximity sensor, or a video image captured by the external device.

According to one or more embodiments, the system is configured to convert the motion signal received by the IC controller into a specific operating instruction for an application executing on the external device.

According to one or more embodiments, the conductive traces comprise a capacitor array incorporated therein for capturing the touch pattern in the form of one or more capacitance values.

According to one or more embodiments, the conductive traces comprises a resistor array incorporated therein for capturing one or more of the gesture pattern and the movement pattern in the form of one or more resistance values.

According to one or more embodiments, the IC controller is configured to communicate wirelessly with the external device.

According to one or more embodiments, the IC controller is configured to communicate with the external device via a wired connection.

According to one or more embodiments, the acoustic output comprises one or more of: an electrodynamic acoustic output and an electrostatic acoustic output.

According to one or more embodiments, the tactile output comprises one or more of: a vibration output, a thermochromic visual output, an electro-tactile output and a heat-tactile output.

According to one or more embodiments, the sensing circuit is further configured to cause to sense a repetitive body motion associated with an exercise routine, the IC controller is further configured to generate for display a count associated with the repetitive body motion, and the display circuit is further configured to cause to display the count as the image on the printed EL display.

According to one or more embodiments, the EL display divided into a plurality of separately illuminable regions, wherein the display circuit is configured to cause to illuminate one or more of the separately illuminable regions based on the image signal received from the IC controller.

According to one or more embodiments, the system further comprises a touch sensitive liquid crystal display (LCD) screen embedded in the haptic garment, wherein the LCD screen is configured to: display the image based on the image signal received from the IC controller, transmit the actuator output based on the actuator signal received from the IC controller, and capture the touch pattern to generate the motion signal for transmission to the IC controller.

According to one or more embodiments, devices coupled to the conductive traces are configured to perform one or more of: display the image based on the image signal received from the IC controller, transmit the actuator output based on the actuator signal received from the IC controller, and capture one or more of: the touch pattern, the gesture pattern, and the movement pattern associated with the user of the haptic garment to generate the motion signal for transmission to the IC controller.

According to one or more embodiments, one or more of the sensing circuit, the display circuit and the actuator circuit are imprinted on the haptic garment using one or more of: painting, extrusion printing, inkjet printing, screen printing, and lithography printing techniques.

According to one or more embodiments, the haptic garment is formed of a deformable substrate or a nonwoven material.

Disclosed herein is a system comprising a haptic fabric comprising an integrated circuit (IC) controller coupled to the haptic fabric; a sensing circuit configured to cause to transmit a motion signal sensed by a portion of the haptic fabric surface to the IC controller, the motion signal based on one or more of a touch pattern, a gesture pattern, and a movement pattern associated with a user of the haptic fabric, the IC controller configured to transmit a first data associated with the motion signal to an external device; and conductive traces embedded in or fastened to the haptic fabric that electrically couple with the sensing circuit.

According to one or more embodiments, the system further comprises the IC controller configured to receive a second data associated with an image signal from the external device; and a display circuit configured to cause to display an image on a printed electro-luminescent (EL) display attached to a portion of the fabric surface based on the image signal received from the IC controller, wherein the conductive traces further electrically couple with the display circuit.

According to one or more embodiments, the system further comprises the IC controller configured to receive a third data associated with an actuator signal from the external device; and an actuator circuit configured to cause to transmit an actuator output to the portion of the haptic fabric surface that is in sensory contact with a skin surface of a user of the haptic fabric based on the actuator signal received from the IC controller, the actuator output comprising one or more of a tactile output and an acoustic output, wherein the conductive traces further electrically couple with the actuator circuit.

According to one or more embodiments, the system further comprises the IC controller is configured to multiplex across a switching cycle comprising: a sense phase for receiving the motion signal via the sensing circuit, a display phase for transmitting the image signal via the display circuit, and an actuator phase for transmitting the actuator signal via the actuator circuit.

According to one or more embodiments, the haptic fabric is formed of a deformable substrate or a nonwoven material.

Disclosed herein is a method of signaling embedded within a haptic garment, the method comprising receiving, by an integrated circuit (IC) controller coupled to the haptic garment, a first data associated with a motion signal from a sensing circuit, the sensing circuit causing the transmission of the motion signal sensed by a portion of the haptic garment surface to the IC controller, the motion signal based on one or more of a touch pattern, a gesture pattern, and a movement pattern associated with a user of the haptic garment; and transmitting, by the IC controller, of a first data associated with the motion signal to an external device, wherein conductive traces embedded in or fastened to the haptic garment electrically couple with the sensing circuit.

According to one or more embodiments, the method further comprises the IC controller receiving a second data associated with an image signal from the external device; and a display circuit causing to display an image on a electro-luminescent (EL) display attached to a portion of the haptic garment surface based on the image signal received from the IC controller, wherein the conductive traces further electrically couple with the display circuit.

According to one or more embodiments, the method further comprises the IC controller receiving a third data associated with an actuator signal from the external device; and an actuator circuit causing to transmit an actuator output to the portion of the haptic garment surface that is in sensory contact with a skin surface of the user of the haptic garment based on the actuator signal received from the IC controller, the actuator output comprising one or more of a tactile output and an acoustic output, wherein the conductive traces further electrically couple with the actuator circuit.

According to one or more embodiments, the method further comprises the IC controller multiplexing across a switching cycle comprising: receiving the motion signal via the sensing circuit during a sense phase, transmitting the image signal via the display circuit during a display phase, transmitting the actuator signal via the actuator circuit during an actuator phase.

According to one or more embodiments, the method further comprises the conductive traces performing one or more of: displaying the image based on the image signal received from the IC controller, transmitting the actuator output based on the actuator signal received from the IC controller, and capturing one or more of: the touch pattern, the gesture pattern, and the movement pattern associated with the user of the haptic garment to generate the motion signal and transmitting the motion signal to the IC controller.

According to one or more embodiments, the method further comprises displaying the image as alphanumeric text related to one or more of: a telephone call received at the external device, and a text message received at the external device.

According to one or more embodiments, the method further comprises displaying the image based on a multimedia file located on the external device.

According to one or more embodiments, the method further comprises displaying the image as one or more touch controls for operating a multimedia file located on the external device.

According to one or more embodiments, the method further comprises displaying the image indicative of traffic condition contiguous to the user of the haptic garment, the image based on traffic data received by the external device.

According to one or more embodiments, the method further comprises the image related to a driving direction or a driving area map received from the external device.

According to one or more embodiments, the method further comprises displaying the image based on a camera image or a video image captured by the external device.

According to one or more embodiments, the method further comprises converting the motion signal received by the IC controller into a specific operating instruction for an application executing on the external device.

According to one or more embodiments, the method further comprises capturing the touch pattern in the form of one or more capacitance values by the conductive traces, wherein the conductive traces comprise a capacitor array incorporated therein.

According to one or more embodiments, the method further comprises capturing one or more of the gesture pattern and the movement pattern in the form of one or more resistance values by the conductive traces, wherein the conductive traces comprise a resistor array incorporated therein.

According to one or more embodiments, the method further comprises the IC controller communicating wirelessly with the external device.

According to one or more embodiments, the method further comprises the IC controller communicating with the external device via a wired connection.

According to one or more embodiments, the acoustic output comprises one or more of: an electrodynamic acoustic output and an electrostatic acoustic output.

According to one or more embodiments, the tactile output comprises one or more of: a vibration output, a thermochromic visual output, an electro-tactile output and a heat-tactile output.

According to one or more embodiments, the method further comprises the sensing circuit causing the sensing of a repetitive body motion associated with an exercise routine, the IC controller generating for display a count associated with the repetitive body motion, and the display circuit causing the displaying of the count as the image on the printed EL display.

According to one or more embodiments, the method further comprises dividing the EL display into a plurality of separately illuminable regions, the display circuit causing the illumination of one or more of the separately illuminable regions based on the image signal received from the IC controller.

According to one or more embodiments, the method further comprises a touch sensitive LCD screen embedded in the haptic garment performing each of: displaying the image based on the image signal received from the IC controller; transmitting the actuator output based on the actuator signal received from the IC controller; and capturing the touch pattern to generate the motion signal for transmission to the IC controller.

According to one or more embodiments, the printed electro-luminescent (EL) display comprises a light emitting diode (LED) matrix.

According to one or more embodiments, the haptic garment includes an inner layer.

According to one or more embodiments, the haptic garment is formed of a deformable substrate or a nonwoven material.

According to one or more embodiments, the method further comprises devices coupled to the conductive traces performing one or more of: displaying the image based on the image signal received from the IC controller, transmitting the actuator output based on the actuator signal received from the IC controller, and capturing one or more of: the touch pattern, the gesture pattern, and the movement pattern associated with the user of the haptic garment to generate the motion signal and transmitting the motion signal to the IC controller.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION OF THE EMBODIMENTS

Figure 1:
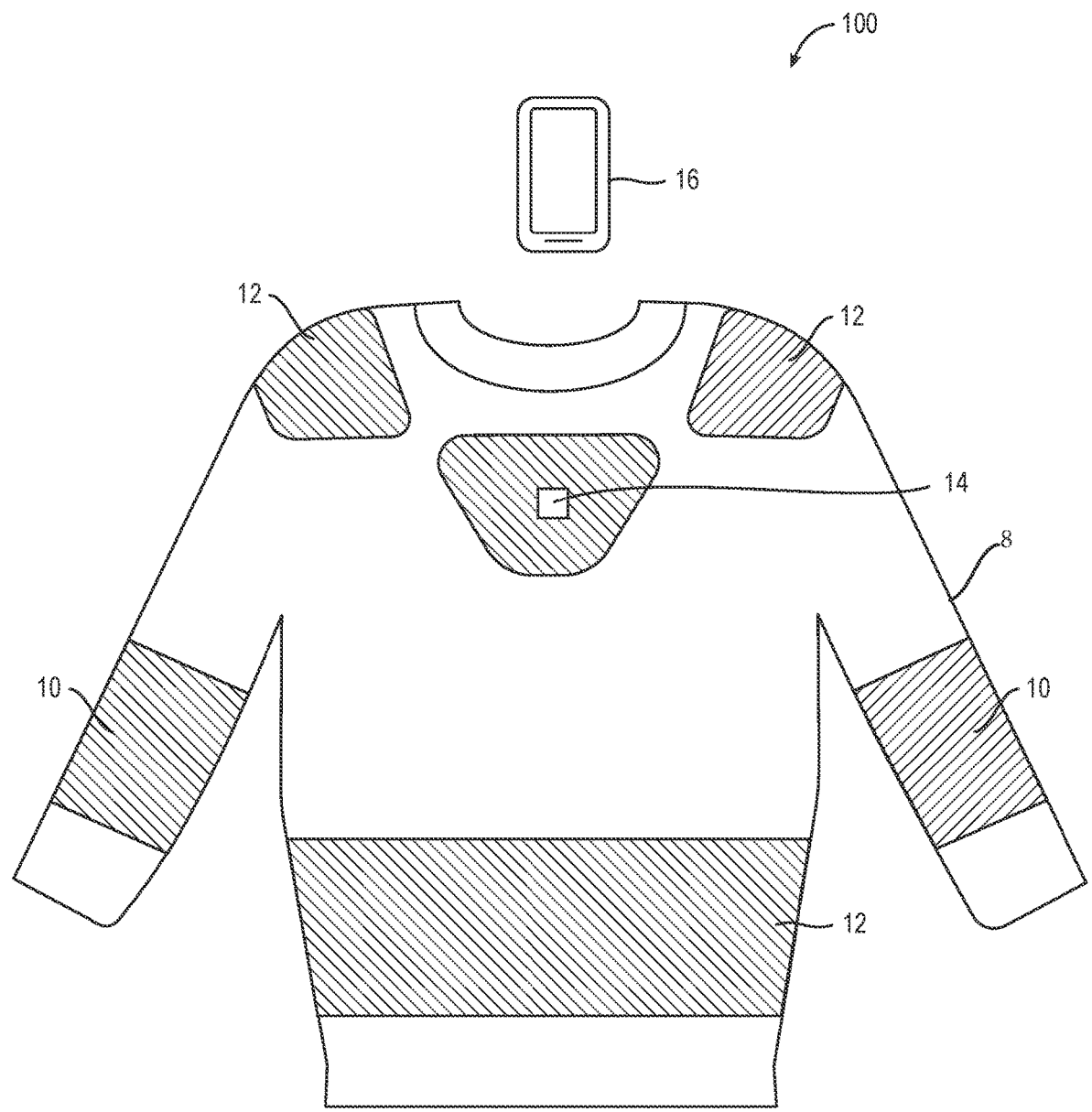
FIG. 1 is a schematic structural diagram of a back view of a system including a haptic garment according to one or more embodiments of the present invention.
Figure 2:
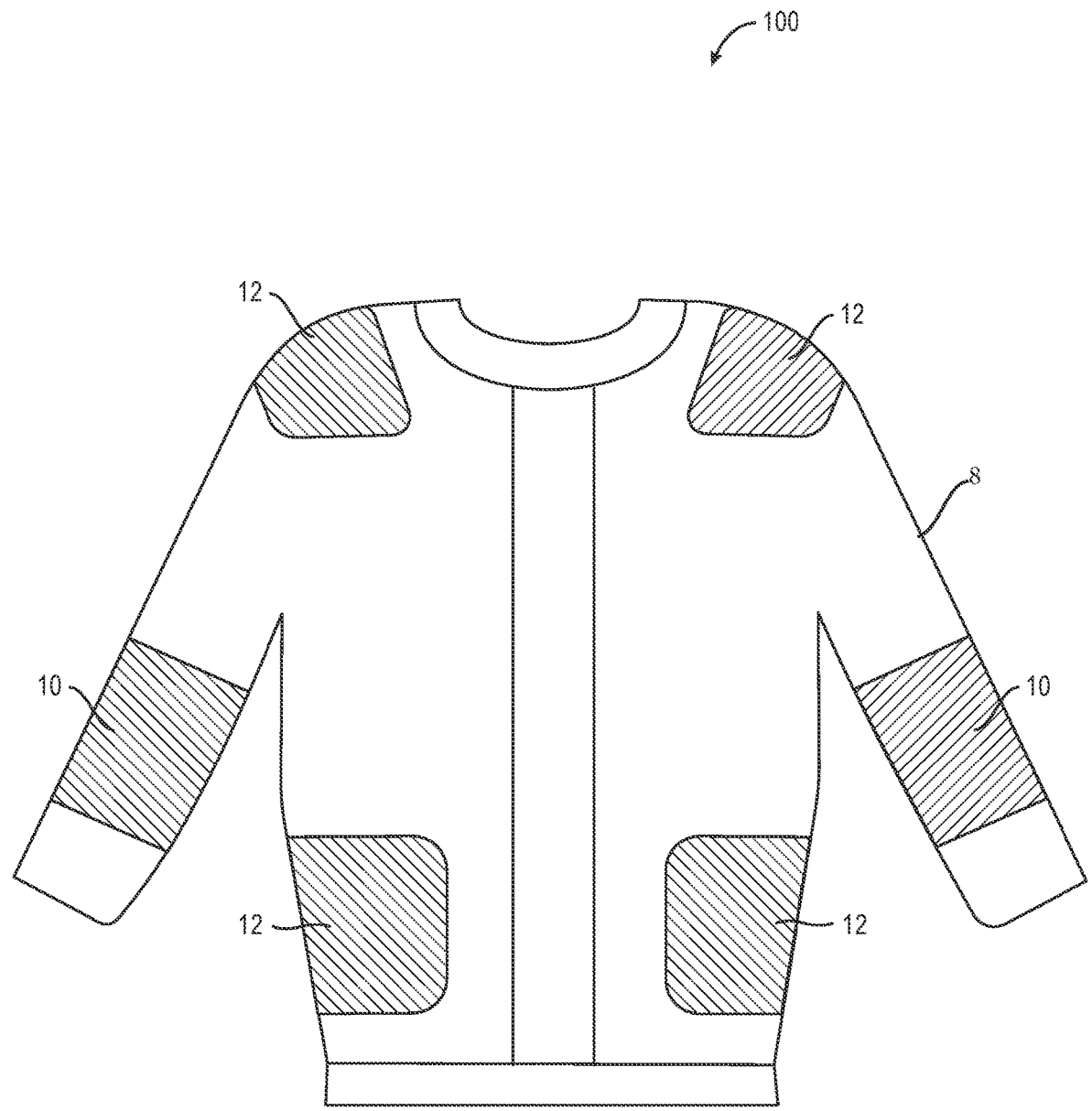
FIG. 2 is a schematic structural diagram of a front view of the system according to one or more embodiments of the present invention.
Figure 3:
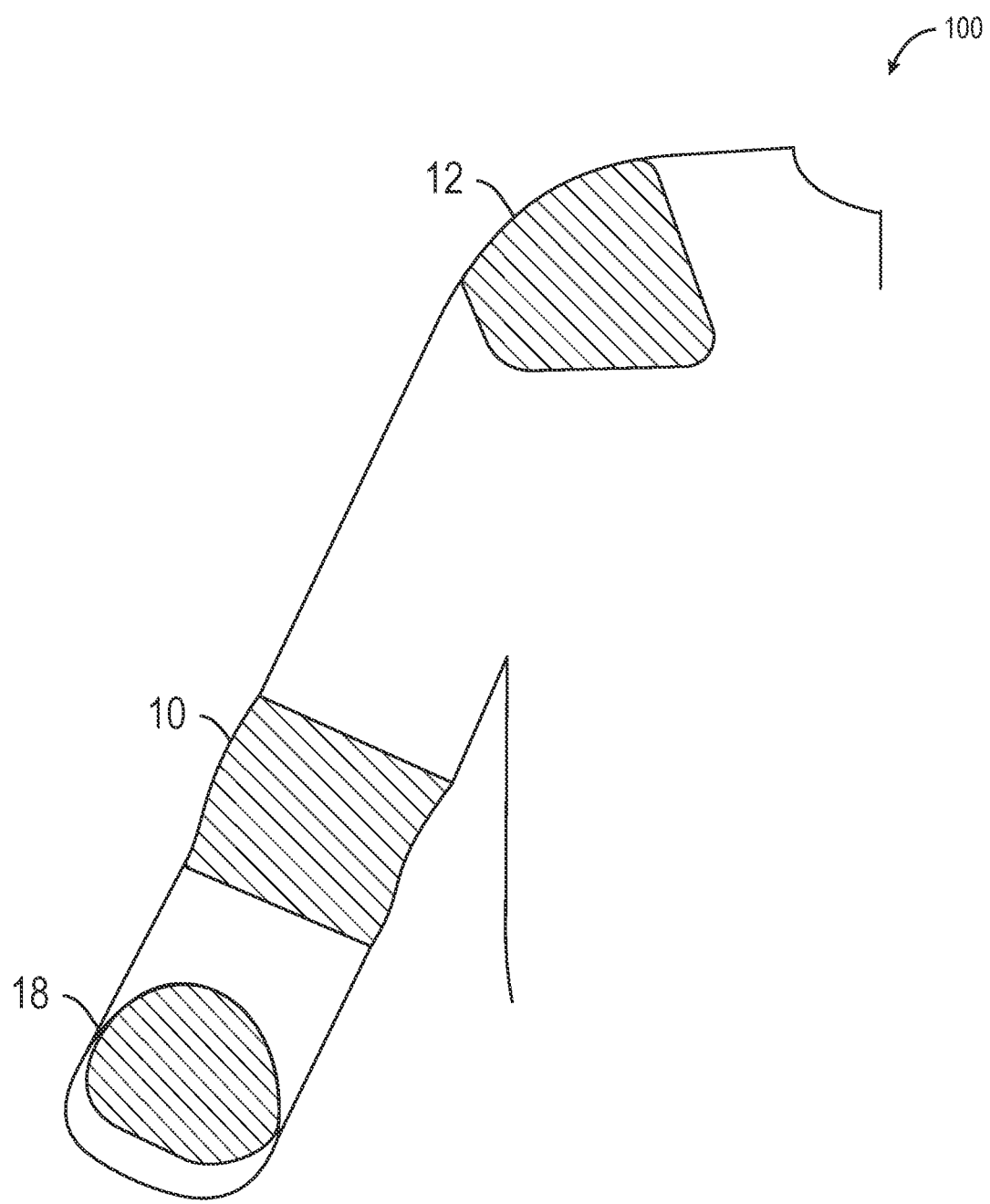
FIG. 3 is a schematic structural diagram of conductive traces coupled within a sleeve of the haptic garment according to one or more embodiments of the present invention.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings:

The present invention relates to a haptic garment, and particularly to a haptic garment capable of two-way communication with a user of the haptic garment through electronic circuitry, devices and sensors provided on the electronic garment. As used herein, the term "garment" refers to an item or combination of items worn or carried by a person or an animal including one or more of the following: top, bottom, undergarment, harness, accessory such as gloves, gauntlet, anklet, bracelet, belt, fanny pack, purse, backpack, apron, and similar other items, headwear such as headband, full or partial balaclava, hat, helmet, and similar other items, or footwear such as socks, shoes, boots, and similar other items. The term "haptic garment" additionally refers to any haptic fabric capable of two-way communication with a user of the haptic fabric through electronic circuitry and sensors provided on the haptic fabric; a haptic fabric includes any woven, knit, or nonwoven fabric, and is made of any material, natural or synthetic. In one embodiment, the haptic fabric is formed of a material that is at least partially electrically conductive. The term "haptic garment" further refers to any flexible haptic membrane such as, for example, a haptic shower curtain, that is capable of two-way communication with a user of the flexible haptic membrane through electronic circuitry and sensors provided on the flexible haptic membrane. In one embodiment, the deformable includes, but is not limited to vacuforming, self-folding prints, extrusion prints, and mold making. While the invention will be described with reference to wearable electronic clothing configured to be worn by a bicyclist riding a bicycle, the techniques explained herein are applicable to all other forms of haptic garment as defined herein including a haptic fabric and a flexible haptic membrane. For example, the haptic garment can have applications as electronic clothing worn by a race car driver, a motorcycle rider, or in similar other applications wherein a garment capable of providing two-way communications between a user and an electronic device may be desirable. In one embodiment, the haptic garment as described herein may be applied to a seat cover on an enhanced video-gaming chair or a movie theatre chair to improve the video-gaming or movie watching experience. In one embodiment, the whole of the haptic garment is in the form of a harness. In another embodiment, more than one haptic garment can be worn by the user at the same time.

The haptic garment as described herein may be safety washed in a washing machine without damaging the circuitry or electronic components integrated therein. Further, each standalone haptic garment is advantageously provided with its own dedicated integrated circuit (IC) controller configured to interact with one or more of a sensing circuit, a display circuit, a actuator circuit, and other devices coupled to, or integrated within, the haptic garment. In some embodiments, one or more components including circuits, conductive traces and devices may be integrated within the haptic garment by imprinting them onto the haptic garment by screen printing techniques. In some embodiments, one or more components including circuits, conductive traces and devices may be coupled to, or integrated within, the haptic garment by gluing or similar other techniques. In some embodiments, one or more components including circuits, conductive traces and devices may be embedded within interlayers or inner layers of the haptic garment. Haptic feedback provided by devices embedded in the haptic garment advantageously include heat-producing circuits and devices, sound-producing circuits and devices, image producing circuits and devices, light producing circuits and devices, vibration stimulation circuits and devices, and similar other circuits and devices coupled to, embedded within, or imprinted onto, or otherwise integrated in some manner with the haptic garment.

The present invention includes a system including a haptic garment, the system capable of registering a user's interaction through electronic circuits present on the haptic garment, the system further capable of displaying imagery information to the user or user of the haptic garment, and providing haptic feedback via printed circuitry to an external device in communication with the system. The invention advantageously includes flexible circuits and conductive traces integrated within the haptic garment, the flexibility resulting from screen printing or extrusion printing techniques. The circuits assist in carrying out tasks such as, for example, controlling of music playback while riding a bicycle by the bicyclist interacting with the integrated traces. The system is further configured for sending user interaction data to an external device; the system further facilitates visual display of data and images received from an external device on a surface of the haptic garment for the bicyclist's view. The system is further configured to advantageously send user interaction data to an external device. The system further provides for devices that provide a visio-gestural based interface for controlling music or notifications on an external device.

The haptic garment may include flexible and illuminative circuits printed onto a cloth dielectric to provide a textile-based user interface for computer interaction. In one embodiment, a user of the haptic garment may be able to control operations on the user's or user's phone or computer by gesturing on the printed circuitry of the haptic garment. The IC controller integrated within the haptic garment is able to interpret the intent of the user based on pattern recognition of the user's actions via devices embedded in or attached to the ends of conductive traces on the haptic garment. In one embodiment, a biker may be able to control music playback while the bike is in motion without breaking concentration from the road.

In one embodiment, the output of the haptic garment includes visual and tactile outputs. An electroluminescent (EL) printed circuit displays information to the user of the haptic garment. The EL display device may include a conductive screen printed design of multiple illuminative segments of a material. Multiple EL segments may advantageously illuminate together to indicate a communication to the user. In one embodiment, the user's phone or computer may provide a wireless signal to the IC controller; the IC controller coupled to haptic garment may receive the information, and illuminate segments in the circuit as specified in the signal received by the IC controller to provide information to the user. In one embodiment, the information provided from the phone or computer to the microcontroller further results in the IC controller generating a haptic response delivered by devices attached to the ends of the conductive traces on the haptic garment. This may advantageously provide notifications to the wearer or user when the wearer or user is not looking at the display on the external device. In one embodiment, the ends of (or the devices attached to the ends of) the conductive traces printed on the inside of the garment provide a low current, and variable voltage and variable frequency AC signal to the user's skin to communicate such notifications. A mild electrical stimulation delivered by the devices attached to conductive traces on the haptic garment may be customized to reflect the user's preferences. In one embodiment, the devices at the conductive trace ends include capacitive touch sensors capable of recognizing patterns based on the user touching an outer surface of the haptic garment. The devices at the ends of the printed conductive traces may also advantageously measure vital signs of the user, such as heart rate.

As shown in FIGS. 1-4, the system 100 comprises an integrated circuit (IC) controller 14 coupled to the haptic garment 8. The system 100 further includes a sensing circuit coupled to or embedded in or integrated within the haptic garment 8 configured to cause to transmit a motion signal sensed by a portion of the haptic garment surface to the IC controller. In various embodiments, the motion signal may be based on one or more of a touch pattern, a gesture pattern, and a movement pattern associated with a user of the haptic garment. In various embodiments, the haptic garment 8 includes one or more inner layers. In one embodiment, one of the inner layers represents a harness as illustrated in FIGS. 5-8. In one embodiment, haptic garment 8 includes an inner layer 300 such as a harness coupled to or integrated within a garment layer. "Inner layer" and "inner layer 300" may interchangeably be referred to herein as "harness" or as "harness 300". In one embodiment, various devices 25 are formed into or embedded within the inner layer 300. In some embodiments, a portion of inner layer 300 itself may form one or more devices 25.

Figure 10:
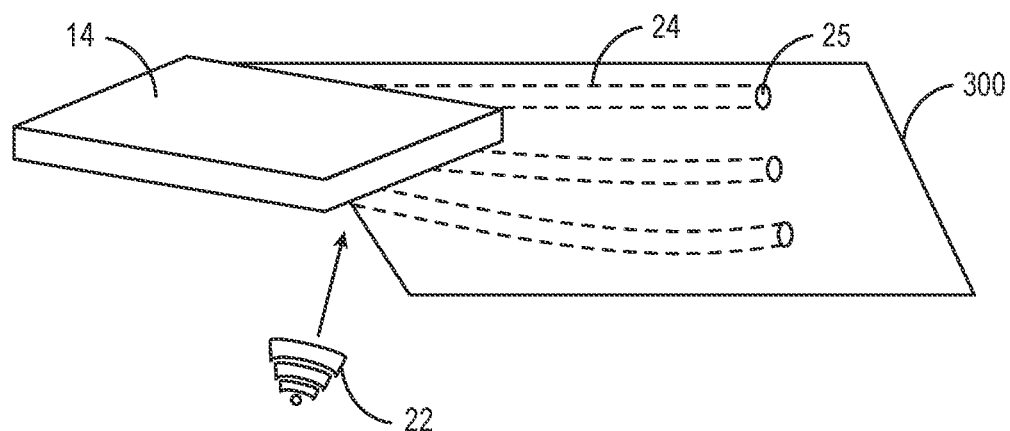
FIG. 10 is a schematic diagram of a system overview illustrating the integrated circuit (IC) controller receiving wireless signals from an external device to interface with ends of conductive traces embedded in the haptic garment according to one or more embodiments of the present invention.

The garment 8 further includes conductive traces 10, 12, 18, 24 embedded in the haptic garment that electrically couple with a sensing circuit, a display circuit, and an actuator circuit. In the Figures, conductive trace contacting elbow region of the user of the haptic garment is designated the numeral 10, conductive trace contacting other parts of body is designated the numeral 12, and conductive trace contacting back of hand is designated the numeral 18; additionally, the conductive trace is generically assigned numeral 24 as shown in FIG. 10, which illustrates a generic conductive trace 24 with a device 25 formed at the end of generic conductive trace 24. In some embodiments, a portion of the conductive trace itself may form one or more devices 25.

The process of producing haptic garment 8 involves a pattern being cut out from pieces of a flexible material, the pattern corresponding to the shape and size of the haptic garment to be formed. After each inner/outer layer is fabricated on or within the haptic garment, a curing process takes place. In one embodiment, a dielectric such as a layer of elastomeric urethane or layer of elastomeric silicone is printed on those cut pieces of fabric or on the haptic garment itself. In one embodiment, the elastomeric urethane is Nazdar® Urethane and the elastomeric silicone is EcoFlex® silicone.

A conventional garment includes a high range of flexibility whereby conductive traces may disintegrate or detach, causing short circuits or lost connection. However, in the flexible material as described herein, such negative effects are minimized or eliminated by the materials used as well as the techniques used to attach or intergrade various components within the haptic garment 8. As an illustrative example, inventors use an elastomeric ink such as Nazdar®, for example, to hold material in place and to minimize damage during washing; in another illustrative example, inventors use a silicone ink based on EcoFlex® silicone to hold material in place and to minimize damage during washing. In one embodiment, a further layer of silver nanoparticle is printed onto the haptic garment or the fabric. A further layer of elastomeric urethane is ink then printed thereon to insulate the skin in desired areas. Each of the devices and circuits and other needed hardware may be manufactured in this manner. In one embodiment, the prefabricated device such as a sensor or actuator as well as the circuits may be stitched onto the haptic garment with conductive thread, inline with the printed conductive traces. In one embodiment, the circuits may be attached by mechanical fastening means. In another embodiment, the circuits may be glued to the haptic garment. In one embodiment, the visual display device may be fabricated in a second process after the above steps are completed. The second process may include printing of a layer of silver nanoparticle ink to connect to the traces in process one. A layer of elastomeric urethane may be printed on that layer to create a dielectric. An electroluminescent phosphor ink may then be printed on the layer of elastomeric urethane A layer of transparent conductive ink is then printed on the layer of phosphor. A silver nanoparticle lead is then printed connecting the transparent conductive layer with the controller circuit. A layer of elastomeric urethane is then printed on top of the transparent conductive to encapsulate the electronic material, the devices and circuits as needed. Each process may be applied to just one side of the fabric or to both sides of the fabric with substrate through-holes to electrically connect the proper areas.

According to one or more embodiments, the conductive traces 24 as well as the devices 25, the circuits and any other needed hardware may be attached to or coupled to the haptic garment 8 using one or more of the following techniques: weaving, knitting, gluing, stitching, attaching by Velcro®, snapping, mechanical fastening, and printing on the haptic garment 8. In one embodiment, mechanical fastening means include tiny screws, rivets, snapping mechanisms, and similar other mechanical fastening means. The printing techniques include extrusion printing, inkjet printing, screen printing, roll-to-roll printing, 3D printing, and lithography printing.

According to one embodiment, the devices 25 formed at the end of generic conductive trace 24 include circuitry and hardware that allow performing of functions such as displaying an image based on the image signal received from the IC controller 14, transmitting an actuator output based on the actuator signal received from the IC controller 14, and capture a touch pattern, a gesture pattern, and/or a movement pattern associated with the user of the haptic garment 8 to generate the motion signal for transmission to the IC controller 14. According to one embodiment, the devices 25 represent prefabricated sensors that are later on attached to the haptic garment 8, rather than being fabricated right on the haptic garment 8. Accordingly, in various embodiments, the devices 25 perform the functions of displaying the image based on the image signal received from the IC controller, transmitting the actuator output based on the actuator signal received from the IC controller, and capturing one or more of: the touch pattern, the gesture pattern, and the movement pattern associated with the user of the haptic garment to generate the motion signal and transmitting the motion signal to the IC controller.

Figure 4:
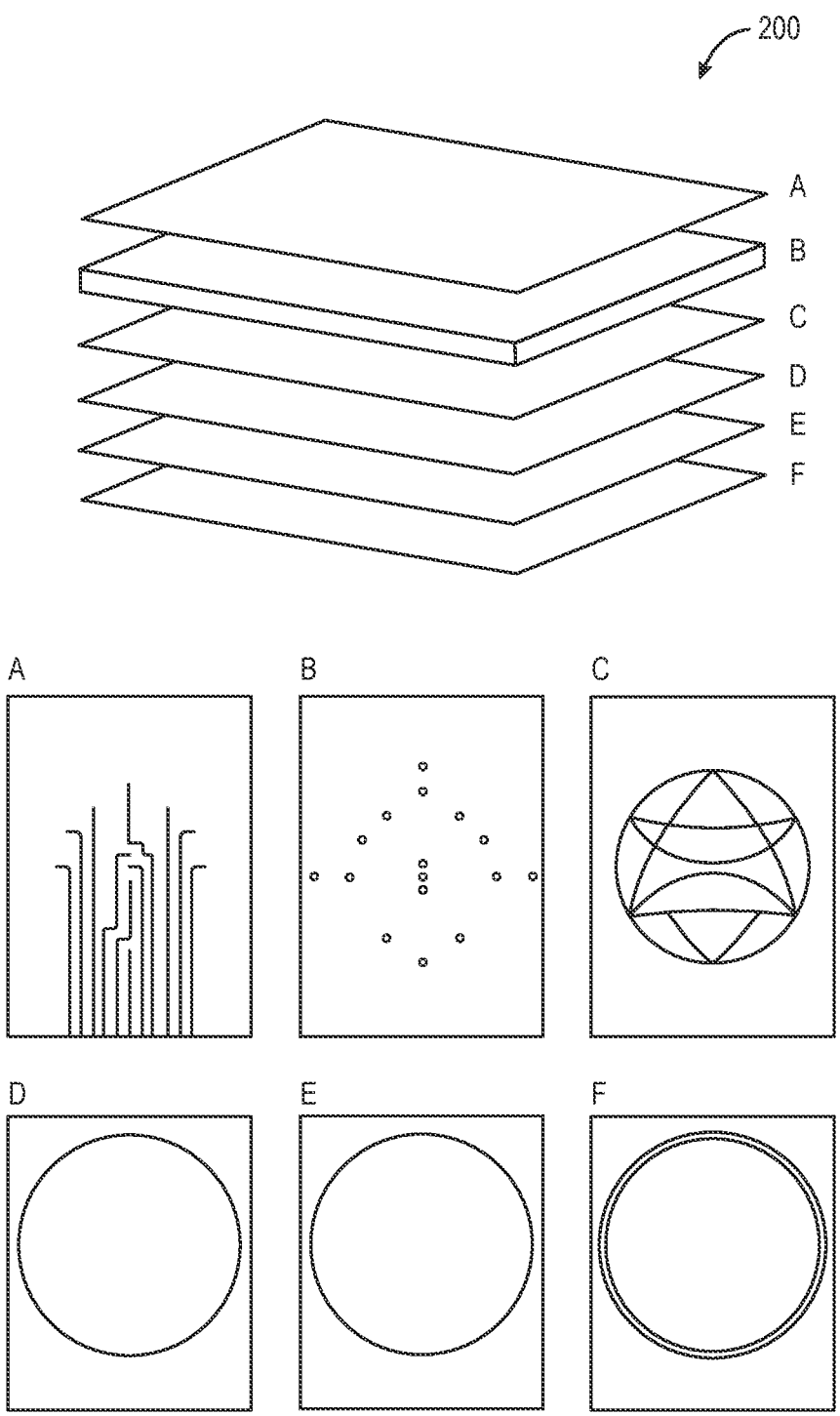
FIG. 4 is a schematic structural diagram of devices formed at an end of a conductive trace coupled to the haptic garment according to one or more embodiments of the present invention.

FIG. 4 illustrates several interlayers 200 associated with devices 25 formed at the ends of the conductive trace 24. Devices 25 are attached to, or embedded within, or embedded on, the haptic garment 8. In one embodiment, device 25 formed at the end of generic conductive trace 24 (see FIG. 4) provide the circuitry, devices and other required hardware for performing the above mentioned functions. In another embodiment, a portion of the inner layers of haptic garment 8 (that are electrically coupled to ends of conductive traces 24) themselves represent devices 25 that provide the circuitry, devices and other required hardware for performing the above mentioned functions. In such an embodiment, devices 25 are formed by a portion of the inner layer(s) of the haptic garment 8, the devices being in electronic communication with IC controller 14 through conductive traces 24. In one embodiment, the devices 25 at the end of the conductive traces 24 are attached to the haptic garment 8 by one or more of the following techniques: weaving, knitting, gluing, stitching, attaching by Velcro©, mechanically fastening and printing on the haptic garment.

As shown in FIG. 4, in one embodiment, interlayer A is a first printed electronic sensor, interlayer B is a first dielectric interlayer, interlayer C is a second printed electronic sensor, interlayer D is visual display interlayer (e.g., an electro-luminescent or EL display interlayer), interlayer E is a second dielectric interlayer, and interlayer F is a third printed electronic sensor. All of the interlayers may be stacked one on top of the other in the manner shown in FIG. 4.

In various embodiments, interlayer A may be formed of a conductive ink layer of ink, insulated and may be capable of providing stimulation to the user's skin. Silver, copper nanoparticle ink may be used in forming interlayer A. In one embodiment, interlayer B may represent a dielectric cloth and dielectric coating layer; it may be formed of a polymer ink in one embodiment. In one embodiment, interlayer C may be formed of a conductive ink layer of ink with interlayer C facilitating the illumination of a phosphor material incorporated in interlayer D. In one embodiment, interlayer C may additionally be capable of registering capacitive touch and user input in one embodiment. In one embodiment, interlayer C may be formed of silver or copper nanoparticle ink. In one embodiment, interlayer D may represent as illuminative phosphor layer; it may be formed of a zinc sulfide ink in one embodiment. In one embodiment, interlayer E acts as a color filter for light produced by phosphor layer; in one embodiment, it may be formed using a polymer ink. In one embodiment, interlayer F represents a transparent conductive layer; in one embodiment, interlayer F may form a common ground for other conductive traces. In one embodiment, the conductive interlayers C and F are capable of registering capacitive touch on predefined areas of the haptic garment 8.

The devices 25 present at the end of generic conductive trace 24 use various techniques for sensing touch based gestures. In one embodiment, IC controller 14 reads a capacitive value from each segmented conductive trace in interlayer C to recognize pre-programmed patterns of values. In one embodiment, visual display 26 represents screen printed electroluminescent panels as shown in FIG. 4, these panels providing information to the peripheral vision of the user.

To create the requisite layout of various devices on the haptic garment 8, stencils of predefined configurations are made using polyester or using stainless steel mesh and a photosensitive emulsion. A specific design stencil may be developed for each layer of ink. The inks are then printed through each specific stencil onto a dielectric substrate or a conductive substrate of a fabric or garment. The inks are layered depending on the function of each interlayer, i.e., input only, output only, or combined input and output. In one embodiment, after the fabric is printed with the various devices, it may be cut into pieces to be sewn into the haptic garment. In another embodiment, the garment may first be sewed prior to the formation of interlayers therein.

In various embodiments, the harness 300 or inner layer 300 (see FIGS. 5-8) facilitates contact with the skin of the user of the haptic garment to provide the haptic stimulation. The IC controller attaches to this as well. This garment may contain EL, but primarily is for haptics. An outer layer of the haptic garment electrically and securely connects with the inner part. The outer layer of the haptic garment, or devices embedded in the outer layer of the haptic garment, may provide EL visual outputs and touch/gesture input.

During operations, in one embodiment, external device 16 runs an application or set of programmed instructions operating on external device 16 based on the input communicated by IC controller 14. External device 16 may be a cell phone, a handheld computing device, or a similar other computing device. IC controller 14 processes data or information received from external device 16, and responsive to the received data or information, IC controller 14 triggers one or more solid state diodes or triacs to allow current to flow through their respective gates to interlayers A, C and F. This in turn results in interlayer D illuminating; in conductive traces 24 providing actuation voltage to devices 25; in a tactile, audio, or light output on the haptic garment; and/or, in an image being displayed in visual display 26. The triacs may advantageously electrically attach to devices 25, and operate to pulse width modulate electricity across the conductive traces 24 and to devices 25 to facilitate the various functions to be performed by haptic garment 8. The circuits and the conductive traces may be insulated at specific points using a rubber-based ink.

Figure 5:
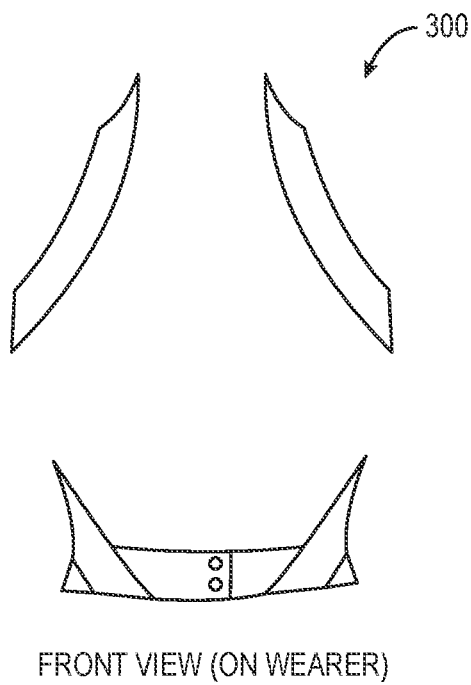
FIG. 5 is a schematic structural diagram of a front view of an inner layer of the haptic garment when worn by a user according to one or more embodiments of the present invention.
Figure 6:
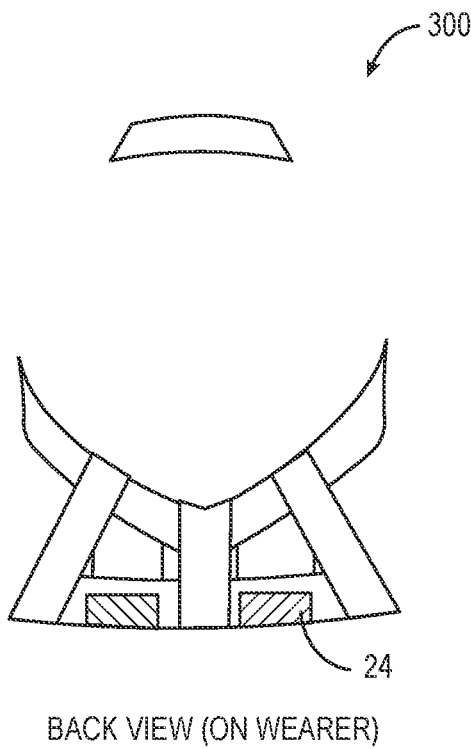
FIG. 6 is a schematic structural diagram of a back view of the inner layer of the haptic garment when worn by a user according to one or more embodiments of the present invention.
Figure 7:
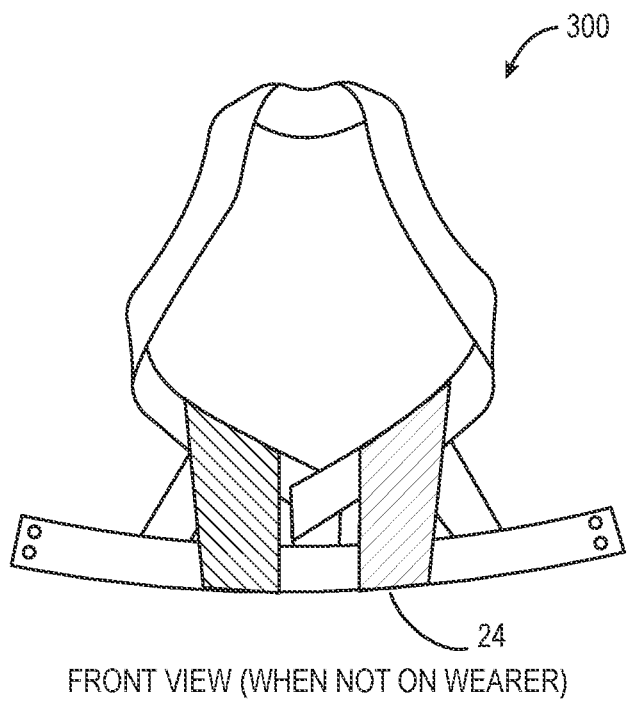
FIG. 7 is a schematic structural diagram of a front view of the inner layer of the haptic garment when not worn by a user according to one or more embodiments of the present invention.
Figure 8:
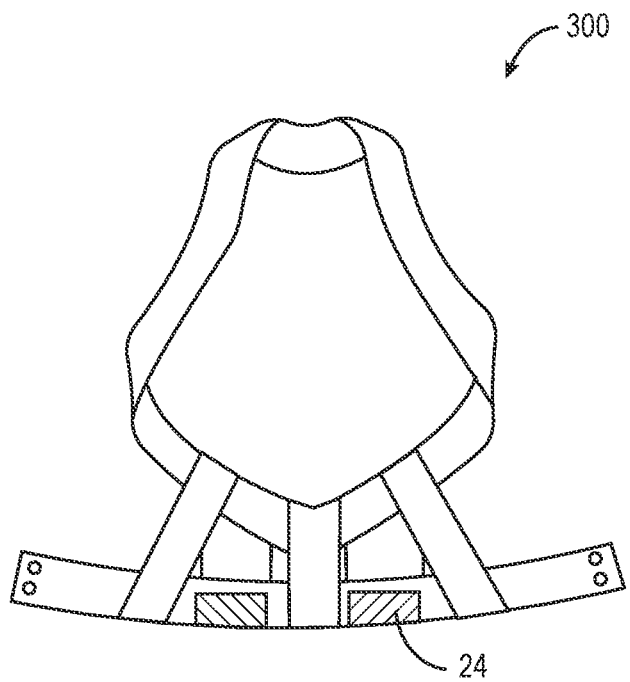
FIG. 8 is a schematic structural diagram of a back view of the inner layer of the haptic garment when not worn by a user according to one or more embodiments of the present invention.

According to one embodiment, the haptic garment 8 includes one or more inner layers. In one embodiment, this inner layer represents a harness as illustrated in FIGS. 5-8. FIG. 5 is a schematic structural diagram of a front view of an inner layer 300 of the haptic garment 8 when worn by a user according to one or more embodiments of the present invention. FIG. 6 is a schematic structural diagram of a back view of the inner layer 300 of the haptic garment 8 when worn by a user according to one or more embodiments of the present invention. FIG. 7 is a schematic structural diagram of a front view of the inner layer 300 of the haptic garment 8 when not worn by a user according to one or more embodiments of the present invention. FIG. 8 is a schematic structural diagram of a back view of the inner layer 300 of the haptic garment 8 when not worn by a user according to one or more embodiments of the present invention. Each of FIGS. 5-8 shows conductive traces 24 configured for contacting back of the body of the user of haptic garment 8.

Figure 13:
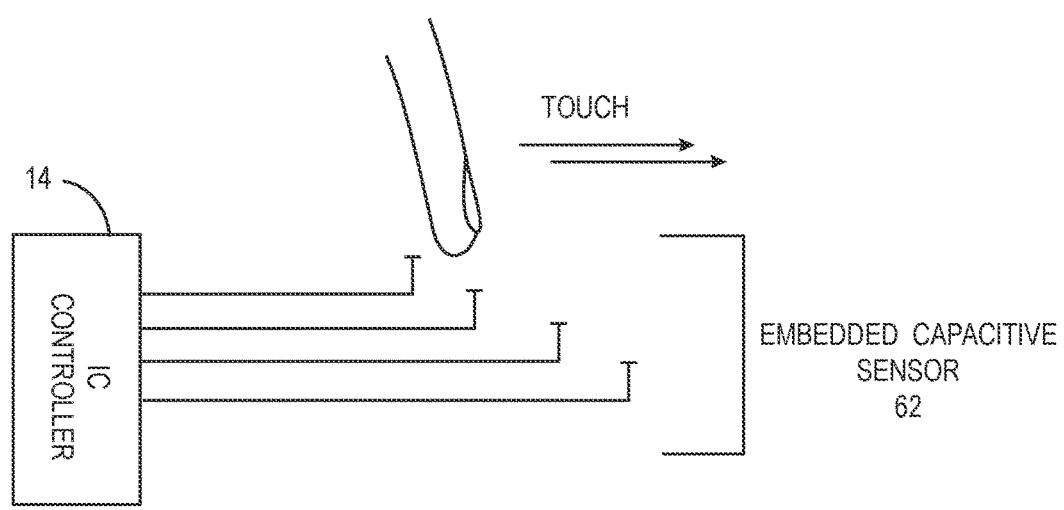
FIG. 13 is a schematic structural diagram of the IC controller processing a touch input sensed by a capacitive sensor according to one or more embodiments of the present invention.

According to one embodiment, the ends of conductive traces 24 connect to a capacitor array incorporated in the haptic garment 8. The capacitor array advantageously captures the touch pattern (caused, for example, by the user of the haptic garment) in the form of a series capacitance values captured over a period of time and over a space across the haptic garment. In one embodiment, the touch pattern may be generated by a person not wearing the haptic garment, the person merely being located close to the haptic garment. The capacitance values are communicated to the external device 16 via IC controller 14 for recordation as a series of capacitance values plotted against time by specific locations on the surface of haptic garment at which each capacitance value is sensed. The external device 16 may process this series of capacitance values plotted against time and location to generate a symbol which corresponds to a certain predefined action to be taken regarding an application operating on the external device 16. In one embodiment, for example, the action to be taken represents the playing of a certain audio file stored in the external device 16. In another embodiment, for example as shown in FIG. 13, embedded capacitive sensors 62 receive a touch pattern and communicate the same to the external device 16.

According to one embodiment, the ends of conductive traces 24 connect to or end in a resistor array incorporated in the haptic garment 8. The resistor array advantageously captures gesture pattern and/or a movement pattern initiated by the user of the haptic garment in the form of a series of resistance values captured over a period of time and over a space across the haptic garment. The resistance values are communicated to the external device 16 via IC controller 14 for recordation as a series of resistance values plotted against time as captured by specific locations on the surface of haptic garment where each resistance value was sensed. The external device 16 may process this series of resistance values plotted against time and location to generate a symbol which corresponds to a certain predetermined action to be taken regarding an application operating on the external device 16. In one embodiment, for example, the action to be taken is the storing of the movement pattern in a fitness application operating on the external device 16. In another application, the action to be taken is the playing of a certain audio file stored in the external device 16 based on the gesture pattern.

Figure 14:
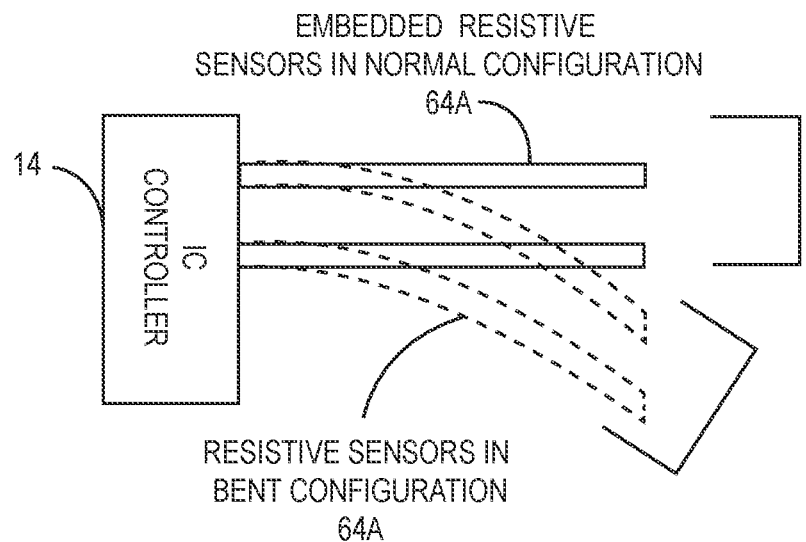
FIG. 14 is a schematic structural diagram of the IC controller processing a bending movement sensed by a resistive sensor according to one or more embodiments of the present invention.

For example, as shown in FIG. 14, embedded resistive sensors 64a receive a movement pattern and communicate the same to the external device 16; FIG. 14 illustrates embedded resistive sensors 64a in a normal configuration as well as in a bent configuration, the bending resulting from a movement pattern caused by the user of the haptic garment 8. In one embodiment, the sensing circuit causes embedded resistive sensors 64a to sense a repetitive body motion associated with an exercise routine; in one embodiment, the sensing circuit causes embedded resistive sensors 64a to sense a training routine or dance performance; based on this, the IC controller 14 generates for display a count associated with the repetitive body motion, training routine, or dance performance, with the display circuit causing to display the count as the image on the visual display 26.

Figure 15:
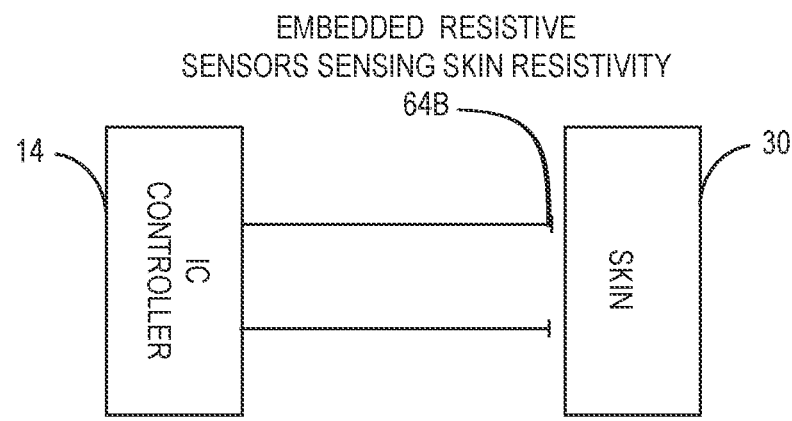
FIG. 15 is a schematic structural diagram of the IC controller processing a movement pattern sensed by a resistive sensor according to one or more embodiments of the present invention.

In a further example, as shown in FIG. 15, embedded resistive sensors 64b sense a change in resistivity of the skin surface of the user and communicate the same to the external device 16; FIG. 15 illustrates embedded resistive sensors 64b operating to sense changes in skin sensitivity over time and over different skin areas. In a further example, the resistance values captured by the resistive sensors 64b are associated with a gesture pattern performed by the user of the haptic garment 8, wherein the gesture does not involve the user physically touching the haptic garment 8.

Figure 12:
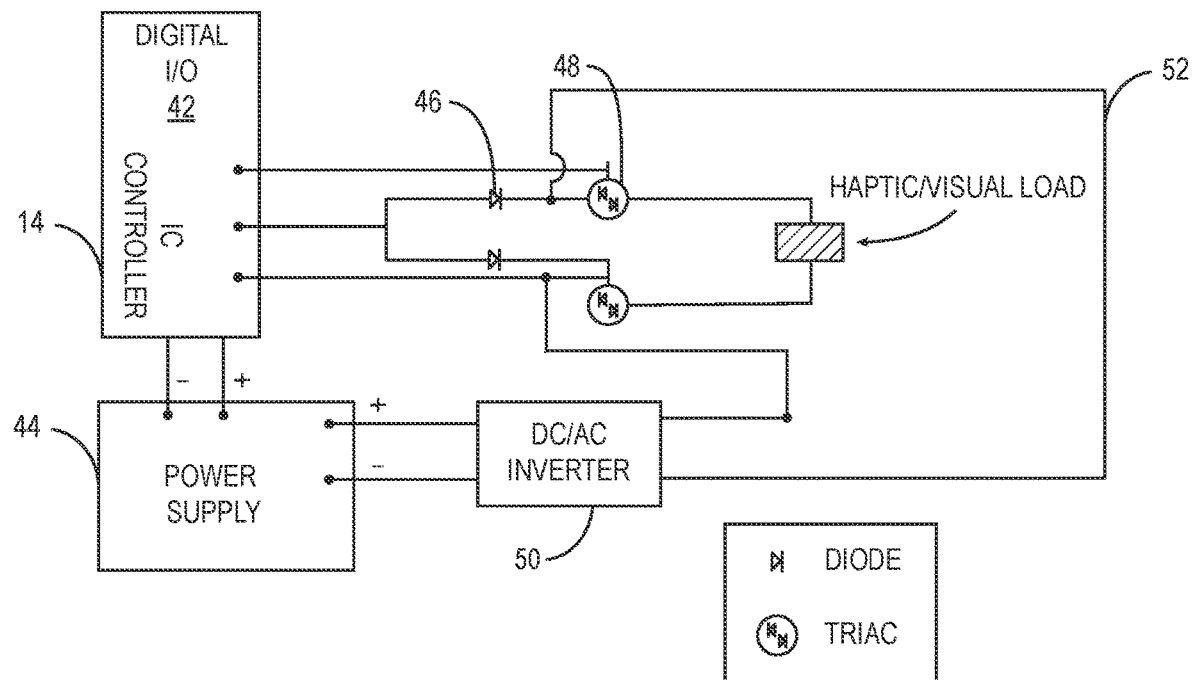
FIG. 12 is a schematic diagram of a circuit including the IC controller according to one or more embodiments of the present invention.

FIG. 12 shows a circuit diagram associated with the IC controller 14 according to one embodiment. In one embodiment, IC controller 14 is coupled with a processor, a DC to AC inverter, a power source, a wireless module, a triac, a diode, and similar other devices and components. In one embodiment, IC controller 14 connects to a high power processor operating on external device 16 using the wireless module. Based on the information received from external device 16, IC controller 14 may activate various components that it is coupled to. The triacs may control the flow of the AC to the printed conductive traces 24. The conductive traces 24 may be electrically coupled to a capacitive sensing circuit within the logic board of IC controller 14. Screen printed conductive traces on the inside of haptic garment 8 may provide a low current stimulation to the user's skin. IC controller 14 may control triac switches that allows current to flow to the exposed electrodes.

According to several embodiments, the IC controller 14 as disclosed herein multiplexes across a switching cycle comprising three phases as follows: a sense phase for receiving the motion signal via the sensing circuit, a display phase for transmitting the image signal via the display circuit, and an actuator phase for transmitting the actuator signal via the actuator circuit. According, when in its operation mode, IC controller 14 multiplexes across a switching cycle to perform each of the following functions: receiving the motion signal via the sensing circuit during a sense phase, transmitting the image signal via the display circuit during a display phase, transmitting the actuator signal via the actuator circuit during an actuator phase.

According to one embodiment, the system converts a motion signal received from devices 25 present at the ends of conductive trace 24 by the IC controller 14 into a specific operating instruction for an application executing on the external device 16. The IC controller 14 is able to communicate with an external device both via a wired connection as well as with a wireless connection. The wireless connection may include a Wi-Fi connection, a Bluetooth connection, a cellphone network tower connection, a satellite connection, and a similar other wireless connection technology.

Figure 9:
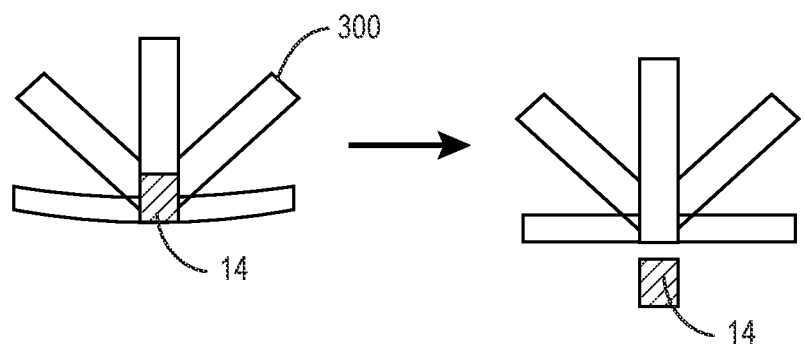
FIG. 9 is a schematic structural diagram of an integrated circuit (IC) controller being detached from the inner layer of the haptic garment according to one or more embodiments of the present invention.

As shown in FIG. 9, the IC controller 14 is detachably attached to the inner layer 300 of the haptic garment 8. A further power supply 44 (as shown in FIG. 12) may also detachably connect to IC controller 14 and to the garment 8 or inner layer 300 of the haptic garment 8.

As shown in FIG. 10, the system as disclosed herein includes IC controller 14 receiving a wireless signal 22 from external device 16 to interface with conductive traces 24 embedded in the haptic garment 8.

Figure 11:
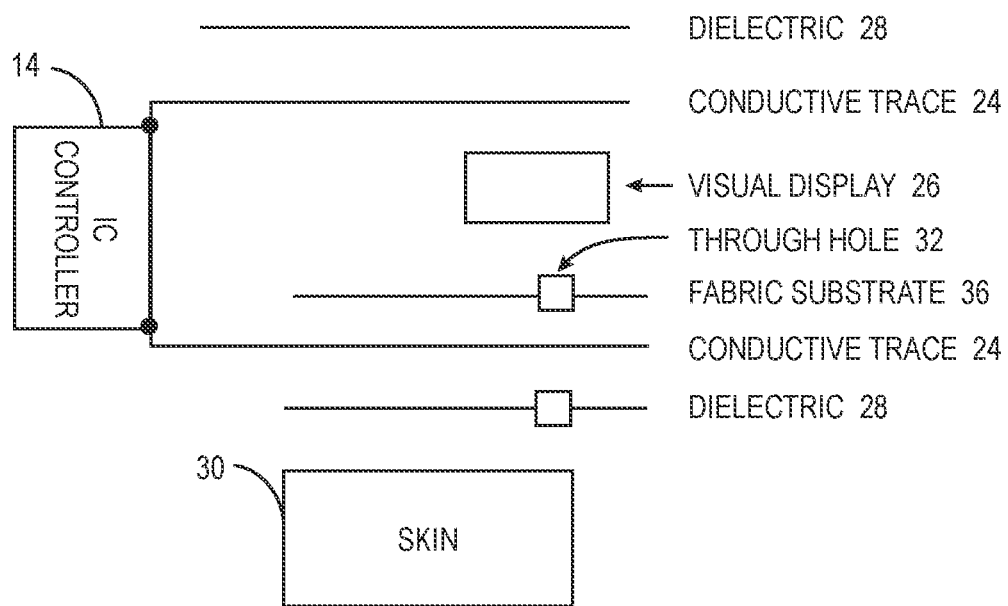
FIG. 11 is a schematic diagram of a system overview illustrating the IC controller and various components including devices, circuits and interlayers coupled to the haptic garment according to one or more embodiments of the present invention.

As shown in FIG. 11, IC controller 14 interfaces with various components including devices 25, conductive traces 24 and any other hardware embedded on, within, or attached to haptic garment 8, and further to those portions of the inner layers of haptic garment 8 that form devices 25. The inner layers and the outer layers of haptic garment 8 include devices 25, circuitry, conductive traces 24, and other required hardware for performing the above mentioned functions. For example, as shown in FIG. 11, a portion of the inner layers of haptic garment 8 may include dielectric layers 28, one or more devices such as, for example, visual display 26, through holes 32, fabric substrates 36, conductive traces 24. The devices attached to the inner layers or built into the inner layers may be in sensory contact with skin 30 of the user of the garment. The garment 8 may also include through holes 32 to help improve the sensory impact on the skin caused by the conductive traces 24 as well as devices 25 coupled to ends of conductive traces 24.

FIG. 12 is a schematic circuit diagram associated with the IC controller, according to one embodiment. As shown in FIG. 12, IC controller 14 interfaces with various components coupled to, or embedded within, haptic garment 8 via digital inputs/outputs 42. Further as shown in FIG. 12, power supply 44 supplies power to IC controller 14 as well as to all other loads on haptic garment 8 including haptic/visual loads 52 and all circuits, devices and other hardware requiring power that operate on haptic garment 8. In one embodiment a DC to AC inverter 50 may be provided for converting the DC power supplied by the power supply 44 to AC power for operating any circuits, devices and other hardware that require AC power for operations. The circuit may further include one or more diodes 46 for one-way signal transmission with devices and circuits operating on haptic garment 8. The circuit may further include one or more triacs 48 for two way signal transmission to and from the devices and circuits operating on haptic garment 8.

In one embodiment, in addition to transmitting a first data associated with the motion signal to the external device 16, the IC controller 14 also receives a second data associated with an image signal. A display circuit causes to display an image on a visual display 26 (see FIG. 11) based on the image signal received from the IC controller 14, the image signal being based on the second data. In one embodiment, visual display 26 is a printed electro-luminescent (EL) display, coupled to, embedded on, or integrated within, a portion of the haptic garment surface. In one embodiment, IC controller is capable of capturing the user's interactions (touch-based or gestural) with the EL display and transmitting the same to external device 16.

In one embodiment, the IC controller 14 further receives a third data associated with an actuator signal from external device 16. An actuator circuit causes to transmit an actuator output to the portion of the haptic garment surface that is in sensory contact with a skin surface of a user of the haptic garment based on the actuator signal received from the IC controller, the actuator output comprising one or more of a tactile output and an acoustic output. According to one embodiment, the acoustic output from the haptic garment 8 represents an electrodynamic acoustic output and/or an electrostatic acoustic output provided by one or more devices 25. According to one embodiment, the tactile output generated by device 25 comprises a vibration output, a thermochromic visual output, an electro-tactile output and/or a heat-tactile output.

According to one or more embodiments, the IC controller is configured to multiplex across a switching cycle comprising: a sense phase for receiving the motion signal via the sensing circuit, a display phase for transmitting the image signal via the display circuit, an actuator phase for transmitting the actuator signal via the actuator circuit, and a generic signal processing phase. In one embodiment, one or more of the sensing circuit, display circuit and the actuator circuit may be physically integrated within the housing that houses the IC controller. By contrast, in one embodiment, one or more of the sensing circuit, display circuit and the actuator circuit may be physically integrated with the devices 25 that each of these circuits control. In a further embodiment, one or more of the sensing circuit, display circuit and the actuator circuit may be physically integrated with the conductive traces 24.

In one embodiment, sensory contact is accomplished by physical contact between the haptic garment surface and the skin surface of the user of the haptic garment. In another embodiment, sensory contact with the skin surface of the user of the haptic garment is accomplished through one or more thin flexible layers located between the haptic garment surface and the skin surface of the user of the haptic garment; in other words, according to some aspects of the present invention, there is no direct physical contact required between the surface of the haptic garment and the user's skin for sensory contact to be established and maintained. For example, sensory contact is possible even when there is a layer of clothing or a small layer of air separating the surface of the haptic garment and the user's skin.

The EL display device 25 such as, for example, visual display 26 in electronic communication with the IC controller 14 is capable of displaying an alphanumeric text or symbolic text related to a telephone call and/or a text message received at the external device 16. In one embodiment, the visual display 26 is divided into a plurality of separately illuminable regions, wherein the display circuit is configured to cause to illuminate one or more of the separately illuminable regions based on the image signal received from the IC controller. In a further embodiment, the visual display 26 comprises a touch sensitive liquid crystal display (LCD) screen embedded in the haptic garment, wherein the LCD screen is configured to perform operations such as displaying the image based on the image signal received from the IC controller, transmitting the actuator output based on the actuator signal received from the IC controller, and capturing the touch pattern to generate the motion signal for transmission to the IC controller. In another embodiment, the visual display 26 comprises a light emitting diode (LED) matrix.

In various embodiments, the external device 16 may be a mobile device or a cell phone or a handheld wireless computing device or a wired computing device or a similar other device. According to one embodiment, the image on the visual display 26 is based on a multimedia file located on the external device 16. In one embodiment, a program executing on the external device 16, via IC controller 14, may control all aspects of the images displayed on visual display 26 of the haptic garment 8. According to one embodiment, the image is one or more touch controls configured for operating a multimedia file located on the external device; in one embodiment, this may include controls for opening, playing, pausing, closing, searching of multimedia files operating on the external device 16. According to one embodiment, the displayed image is indicative of traffic condition contiguous to a user of the haptic garment, the image based on traffic data received by the external device 16. According to one embodiment, the image is related to a driving direction or a driving area map received from the external device 16. According to one embodiment, the image is based on a camera image or a video image captured by the external device 16.

According to one embodiment, one or more of the sensing circuit, the display circuit and the actuator circuit are imprinted on the haptic garment using a printing process such as painting, extrusion printing, inkjet printing, screen printing, and lithography printing, for example, in such a manner that the imprinted circuits can withstand several cycles of washing of haptic garment 8 over the life of the haptic garment 8. In one embodiment, a 3D printing process may be used.

According to one embodiment, the third data is not received from external device 16; instead, the third data is received from a program stored on an internal memory attached to haptic garment 8 and coupled to IC controller 14. In one embodiment, IC controller may execute one or more mobile applications stored within the internal memory. The program stored on the internal memory coupled to the IC controller 14 may be associated with functions such as: providing trigger points of muscle stimulation to the user through the haptic garment, therapy for muscle relaxation for the user's muscles through the haptic garment, posture control of the user through the haptic garment, brain stimulation for mental health therapy of the user through the haptic garment, cadence for running/cycling/other sports that the user participates in through the haptic garment, breathing exercise control of the user's breathing through the haptic garment, fitness tracking of the user's fitness activities through the haptic garment, heart rate monitoring of the user through the haptic garment, theft prevention techniques such as, for example, raising an audio or a visual alarm, through the haptic garment, gaming controls and gaming effects through the haptic garment, and similar other applications. In further embodiments, the program operating on the internal memory coupled to the IC controller 14 may also be associated with functions such stimulation in movie theater seats, virtual reality stimulation in various applications, display of clock, display of time left for a prescheduled event, and similar other functions. Further, in some embodiments, the program operating on the internal memory coupled to the IC controller 14 may be associated with functions such as stimulation of muscles and relieving of pain as controlled by a TENS device. TENS devices work by sending electronic stimulating pulses across the surface of the skin and along the nerve strands. The stimulating pulses help prevent pain signals from reaching the brain. TENS devices also help stimulate the body of the user of haptic garment 8 to produce higher levels of its own natural painkillers, called "Endorphins". TENS devices provide pain treatment using low voltage electric current to relieve pain. In one embodiment, the TENS device may be housed in a pouch on the haptic garment 8. In one embodiment, the TENS device may be powered by power supply 44. In one embodiment, the program stored on the internal memory coupled to the IC controller 14 may be associated with asking and/or answering a question associated with a smart assistant program.

During operations, IC controller 14 embedded in haptic garment 8 receives a first data associated with a motion signal from the sensing circuit. A sensing circuit causes the transmission of the motion signal sensed by a portion of the haptic garment surface to the IC controller 14. The motion signal is based on a touch pattern, a gesture pattern, and/or a movement pattern associated with a user of the haptic garment. IC controller 14 transmits the first data associated with the motion signal to external device 16 for further processing.

In one embodiment, IC controller 14 also receives a second data associated with an image signal from external device 16. A display circuit causes to display an image on a visual display 26 attached to a portion of the haptic garment surface based on the image signal received from IC controller 14. In one embodiment, IC controller 14 itself generates the second data.

In one embodiment, IC controller 14 also receives a third data associated with an actuator signal from external device 16. An actuator circuit causes to transmit an actuator output to the portion of the haptic garment surface that is in sensory contact with a skin surface of a user of the haptic garment. The actuator output is based on the actuator signal received from the IC controller. The actuator output may include a tactile output and/or an acoustic output.

In one embodiment, one or more of the first data, second data and third data may be in a form that is not visible to humans such as radio, microwave, infrared, ultraviolet, X-rays, gamma ray, and similar other transfer mediums. In one embodiment, the devices 25 integrated within haptic garment are capable of providing variable intensity of haptic or actuator output based on variable voltage, Pulse Width Modulation (PWM) and AC signal frequency control, and similar other techniques.

In one embodiment, either IC controller 14 or external device 16 converts the motion signal received by IC controller 14 into a specific operating instruction for an application executing on external device 16.

In one embodiment, the sensing circuit embedded in the haptic garment 8 causes the sensing of a repetitive body motion associated with an exercise routine. The IC controller 14 then generates for display a count associated with the repetitive body motion, the display circuit causing the displaying of the count as the image on the printed EL display. In one embodiment, the method further comprises the haptic garment 8 being used to train people on accomplishing various new tasks such as, for example, conditioning for scientific purposes, instructional purposes and/or being used for novelty purposes. In a further embodiment, the method further comprises the haptic garment 8 being used for displaying answers to questions that the user of the haptic garment 8 poses to a smart assistant.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A system comprising:
   a garment comprising a sensing fabric;
   an integrated circuit (IC) controller coupled to the garment;
   a sensing circuit configured to transmit a signal responsive to a user's interaction with a first surface portion of the garment to the IC controller, the IC controller configured to transmit a first data associated with the signal to an external device, wherein the first data is associated with instructions for controlling the external device and the instructions are responsive to the user interacting with the first surface portion of the garment;
   an actuator circuit configured to transmit an actuator output to a second surface portion of the garment based on an actuator signal received from the IC controller, wherein the first surface is separate from the second surface and wherein the IC controller is configured to receive commands from the external device responsive to the first data and transmit the actuator signal is responsive to the commands received; and
   conductive traces embedded within the garment that electrically couple with the sensing circuit and the actuator circuit each said conductive trace having at least a portion being at least one of printed onto the sensing fabric and printed into the sensing fabric.

2. The system of claim 1, further comprising:
   the IC controller further configured to generate an image signal from the external device; and
   a display circuit configured to cause to display an image on a display coupled to a portion of the garment surface based on the image signal received from the IC controller,
   wherein the conductive traces further electrically couple with the display circuit.

3. The system of claim 2, wherein the image signal generated is associated with a second data received from the external device.

4. The system of claim 2, wherein the display comprises a fabric printed electro-luminescent (EL) display.

5. The system of claim 1, wherein the actuator output comprises an acoustic output.

6. The system of claim 1, wherein the actuator output comprises a tactile output.

7. The system of claim 1, further comprising a variable regulator that is configured to modulate the actuator output transmitted by the actuator circuit in response to the actuator signal received from the IC controller.

8. The system of claim 1, wherein the IC controller is detachably attached to a portion of the garment.

9. The system of claim 1, wherein a portion of the conductive traces are configured to capture the user interaction to generate the signal for transmission to the IC controller.

10. The system of claim 1, wherein a portion of the garment comprises a layered configuration, the layered configuration comprising at least a first interlayer upon which the actuator circuit is printed and a second interlayer upon which the sensing circuit is printed.

11. The system of claim 10, wherein the layered configuration further comprises at least one dielectric interlayer disposed between the first interlayer and second interlayer.

12. The system of claim 11, wherein at least one of the interlayers comprises a through-hole, wherein the through-hole is configured to facilitate contact between printed portions on separate interlayers.

13. The system of claim 10, wherein the printed portions upon the respective interlayer of the layered configuration comprise a specified design to facilitate separate functionality of each interlayer.

14. The system of claim 10, further comprising a display circuit configured to cause to display an image on a display based on an image signal received from the IC controller, wherein the layered configuration further comprises a third layer upon which the display circuit is printed.

15. The system of claim 14, wherein the layered configuration further comprises a dielectric layer one or more of the first layer, second layer, and third layer.

16. The system of claim 15, wherein at least one of the layers comprises a through-hole, wherein the through-hole is configured to facilitate contact between printed portions on separate layers.

17. The system of claim 14, wherein the printed portions upon the respective interlayer of the layered configuration comprise a specified design to facilitate separate functionality of each interlayer.

18. A method of displaying information related to commands given to an external device, the method comprising:
providing an external device;
providing a haptic garment coupled to an integrated circuit (IC) controller in communication with the external device, wherein the haptic garment is further coupled with a sensing circuit and a display circuit;
sensing a touch pattern on an external surface of the haptic garment with the sensing circuit;
transmitting a touch signal associated with the touch pattern from the sensing circuit to the IC controller;
transmitting a first data associated with the touch signal to the external device;
generating further data with the external device, wherein the further data includes information responsive to a command identified by or collected in response to the first data;
receiving, by the IC controller, the further data from the external device;
transmitting, by the IC controller, an image signal to the display circuit, wherein the image signal is associated with the further data and the information;
displaying an image associated with the further data and the information on a display of the display circuit, wherein the display circuit and sensing circuit are electrically coupled to conductive traces embedded in the haptic garment.

19. The method of claim 18, wherein the external device further includes a program which collects further input associated with the command in response to the first data.

20. The method of claim 19, wherein the further input collected comprises instructions from a user received by the external device.

21. The method of claim 20, wherein the instructions are vocally communicated to the external device by the user.

22. The method of claim 18, wherein the first data includes information identifying the command.

23. The method of claim 22, wherein the command comprises one of a plurality predefined on the external device.

24. The method of claim 18, wherein the further data includes the image signal associated with the image to be displayed.

25. The method of claim 18, wherein the image signal is generated by the IC controller to incorporate the information from the further data and the image displayed in response to the image signal includes the incorporated information.

26. The method of claim 25, wherein the image signal is generated by a program stored in internal memory coupled to the IC controller.

* * * * *